UNITED STATES PATENT OFFICE.

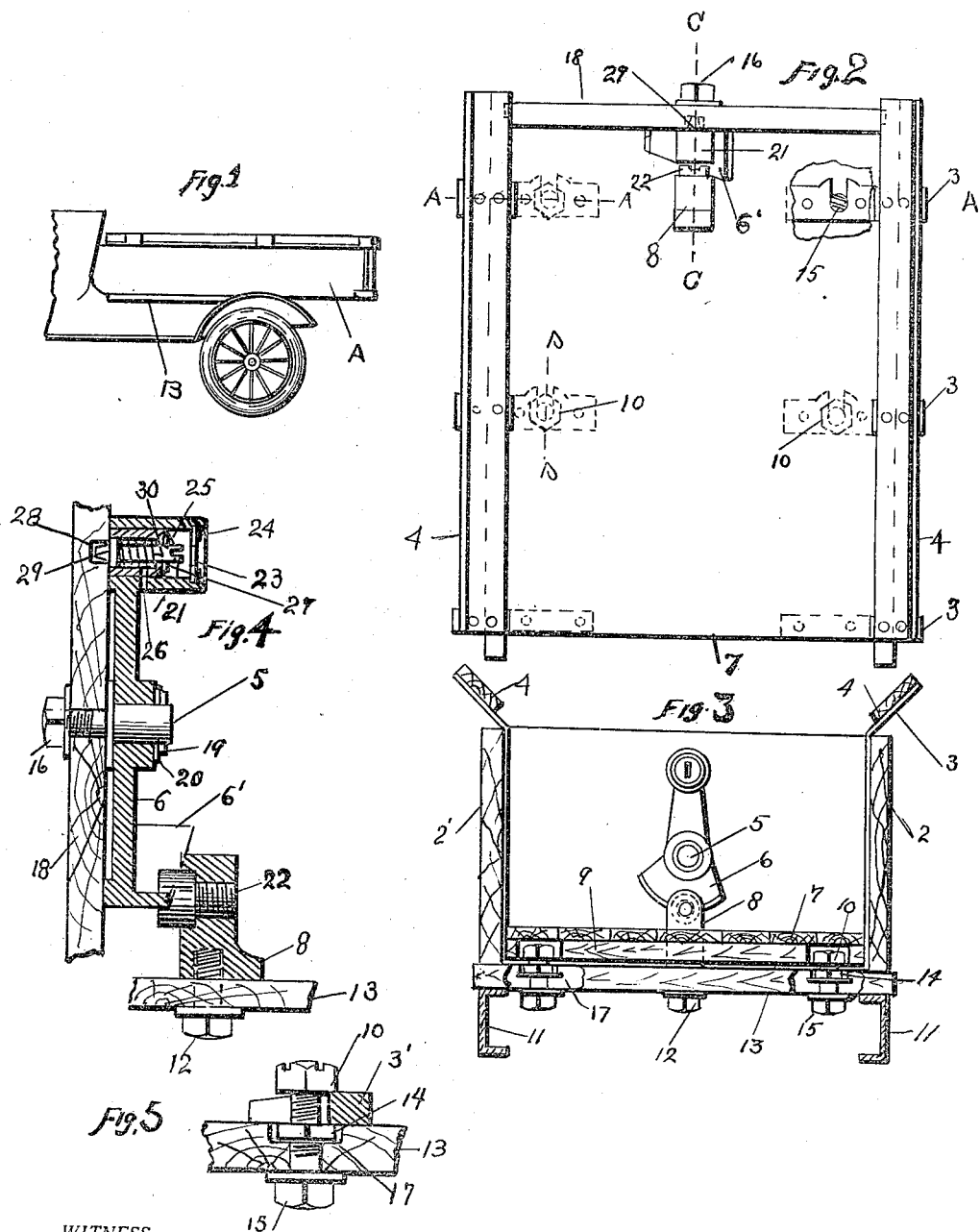

WILLIS E. HARMON, OF WORCESTER, MASSACHUSETTS.

ATTACHING AND DETACHING DEVICE FOR AUTOMOBILE-BODIES.

1,293,090.  Specification of Letters Patent.  Patented Feb. 4, 1919.

Application filed May 13, 1918. Serial No. 234,354.

*To all whom it may concern:*

Be it known that I, WILLIS E. HARMON, a citizen of the United States, residing at Worcester, in the county of Worcester and State of Massachusetts, have invented new and useful Improvements in Attaching and Detaching Devices for Automobile-Bodies, of which the following is a specification.

In the accompanying drawings Figure 1 is a side elevation of a small truck body mounted upon an automobile runabout.

Fig. 2 is a plan view of the truck body with a part broken away to show the slotted wedge member.

Fig. 3 is a vertical sectional view on the line A. A. Fig. 2.

Fig. 4 is a vertical sectional elevation of the control members on the line C. C. Fig. 2 and Fig. 5 is a vertical sectional view of the slotted wedge plate and the chassis floor with the bolt in place.

Now referring to the drawings, the automobile runabout has a floor attached to the channel irons of the chassis to which the bolts 15—15—15 and 15 are secured by the nut #14 over the washer #17.

The wedge members 3'—3'—3'—3', the irons 3—3 and the cross pieces 9—9—9 form the frame to which the bottom 7, side boards 2—2—4—4 and end board 18 are attached in the usual manner.

The control member 6 which is shown in section in Fig. 4 has a cam 6' adapted to engage the adjusting screw 22 in the member 8 which is securely mounted upon the chassis floor 13 by the cap screw 12.

The projection 21 which forms the handle of the control member 6 is shown in Fig. 4; member 6 contains a cam member 25, a plunger 29 having a pin 27 resting on said cam member, a spring 30 which impels the plunger into the recess 28 when the control member is turned to the proper position and a key guard plate held in place by the spring washer 24.

In operation the body is placed on the chassis and pushed forward until the bolts 15—15—15—15 have fully entered the slots in the wedge members 3'—3'—3'—3', then the control member 6 is turned to the right until the punger 29 enters the depression 28; the body is then locked in position.

To unlock the body, a key is inserted through the guard plate 23 into the plunger slot, the key is turned to the right, the pin 27 travels up the cam 25 until the plunger is withdrawn from the depression 28, the control member is turned counter clockwise disengaging the cam 6' from the member 8 thus permitting the body to be pulled back and removed.

What I claim is:—

1. In an attaching and detaching device for automobile bodies, an automobile chassis, a body adapted to fit thereon, connecting mechanism intermediate said chassis and body including slotted wedge plates, threaded projections having nuts adapted to engage the slotted wedge plates when the body is moved horizontally and a key released locking device adapted to control the horizontal movement of the body relative to the chassis and thus hold the connecting mechanism in engagement until said locking device is released by a key.

2. In an attaching and detaching device for automobile bodies, an automobile chassis, a body adapted to fit thereon, connecting mechanism intermediate said body and chassis including wedge members, projecting members adapted to engage said wedge members, a control member adapted to force the above members into engagement and a spring actuated member adapted to hold the parts in a predetermined position.

3. In an attaching and detaching device for automobile bodies, an automobile chassis, a body adapted to fit thereon, means for wedging the chassis and body together when the body is moved horizontally relative to the chassis, a rotatable cam and connections adapted to move the body horizontally, a spring actuated plunger adapted to enter a depression and hold the cam in a fixed position and a cam member adapted to withdraw the plunger from the depression when the plunger is rotated by a key or other means.

In testimony whereof I affix my signature in presence of two witnesses.

WILLIS E. HARMON.

Witnesses:
LOUIS M. FRIEDMAN,
JAMES W. BURKE.

Copies of this patent may be obtained for five cents each, by addressing the "Commissioner of Patents, Washington, D. C."